US010449835B2

(12) United States Patent
Lin et al.

(10) Patent No.: US 10,449,835 B2
(45) Date of Patent: Oct. 22, 2019

(54) VANE ADJUSTMENT DEVICE AND A VEHICLE AIR REGISTER ASSEMBLY

(71) Applicant: Ford Global Technologies, LLC, Dearborn, MI (US)

(72) Inventors: Ryan Lin, Nanjing (CN); Denis Gerard O'Shannessy, Melbourne (AU)

(73) Assignee: Ford Global Technologies LLC, Dearborn, MI (US)

( * ) Notice: Subject to any disclaimer, the term of this patent is extended or adjusted under 35 U.S.C. 154(b) by 345 days.

(21) Appl. No.: 15/610,189

(22) Filed: May 31, 2017

(65) Prior Publication Data
US 2017/0361682 A1  Dec. 21, 2017

(30) Foreign Application Priority Data
Jun. 16, 2016  (CN) .......................... 2016 1 0427698

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC ...... B60H 1/34; B60H 1/3414; B60H 1/3421; B60H 1/3428; B60H 1/3435; B60H 1/3442; B60H 2001/3478; B60H 2001/3471
USPC ................. 454/152, 153, 155, 143
See application file for complete search history.

(56) References Cited

U.S. PATENT DOCUMENTS

| | | | |
|---|---|---|---|
| 9,162,551 B2 | 10/2015 | Yamamoto et al. | |
| 9,278,607 B2 * | 3/2016 | Zalan | B60H 1/3421 |
| 2006/0172680 A1 * | 8/2006 | Gehring | B60H 1/3428 |
| | | | 454/152 |
| 2010/0124876 A1 | 5/2010 | Yu et al. | |
| 2011/0217914 A1 * | 9/2011 | Marutschke | B60H 1/3428 |
| | | | 454/152 |
| 2013/0078900 A1 * | 3/2013 | Zalan | B60H 1/3421 |
| | | | 454/152 |
| 2014/0364045 A1 | 12/2014 | Noichl et al. | |
| 2015/0065031 A1 * | 3/2015 | Shibata | B60H 1/3421 |
| | | | 454/322 |
| 2016/0009163 A1 * | 1/2016 | Terai | B60H 1/3421 |
| | | | 454/155 |
| 2017/0080781 A1 * | 3/2017 | Kwak | B60H 1/00064 |

(Continued)

FOREIGN PATENT DOCUMENTS

| | | |
|---|---|---|
| CN | 201637051 | 11/2010 |
| CN | 201637051 U | 11/2010 |
| DE | 102013016445 A1 | 4/2015 |

(Continued)

*Primary Examiner* — Steven B McAllister
*Assistant Examiner* — Ko-Wei Lin
(74) *Attorney, Agent, or Firm* — Vichit Chea; Kolitch Romano LLP (57) ABSTRACT

A vane adjustment device for an air register having a front vane and a rear vane is disclosed. The vane adjustment device comprises a rear vane connector rotatably connected to the rear vane about a first axis, an intermediate connector rotatably connected to the rear vane connector about a second axis different with the first axis, and a front vane connector rotatably connected to the front vane, the front vane connector including a sliding portion slidably and rotatably connected to the intermediate connector.

19 Claims, 5 Drawing Sheets

(56) References Cited

U.S. PATENT DOCUMENTS

2017/0341488 A1* 11/2017 Kim .................... B60H 1/3421

FOREIGN PATENT DOCUMENTS

| FR | 2844484 A1 * | 3/2004 | ........... B60H 1/3421 |
|----|---|---|---|
| KR | 101283132 B1 | 5/2013 | |
| WO | WO2016013857 A1 | 1/2016 | |

* cited by examiner

VANE ADJUSTMENT DEVICE AND A VEHICLE AIR REGISTER ASSEMBLY

RELATED APPLICATION

This application claims the benefit of Chinese Patent Application No.: CN 201610427698.4 filed on Jun. 16, 2016, the entire contents thereof being incorporated herein by reference.

FIELD

The present invention relates to a vane adjustment device and a vehicle air register assembly.

BACKGROUND

Vehicles are often equipped with an air conditioning system to make passengers feel comfortable. The conditioned air flows into the passenger cabin through an air register. The desired air flow direction and flow rate may be achieved by adjusting the air register. Various air outlet adjustment devices have been designed in the industry.

For instance, China patent CN 201637051 discloses an air register structure, which includes horizontal vanes, vertical vanes, and an adjustment device. The adjustment device includes a recessed insert to match the contour of the horizontal vane.

Adjustment devices for vehicle air registers often include a tab engaged with a vane. Normally the tab includes a fork-like structure to engage the vane and the adjustment devices. The inventors have recognized that although a fork-like adjustment device can be convenient, there are also some disadvantages. For instance, the fork-like adjustment device requires sufficient space between the adjacent vanes to avoid interference while moving around. Further, the fork-like adjustment device requires the rear vanes to be perpendicular with front vanes so that the rear vanes could be actuated. However, in some cases wherein the shape of the air register is irregular, the vanes may not be parallel to the edges of the air register outlet, thus it may be difficult to control the flow rate and the direction of the flowrate.

SUMMARY

According to one aspect of the present disclosure, a vane adjustment device for an air register having a front vane and a rear vane is provided. The vane adjustment device comprises a rear vane connector rotatably connected to the rear vane about a first axis, an intermediate connector rotatably connected to the rear vane connector about a second axis different from the first axis, and a front vane connector rotatably connected to the front vane, the front vane connector including a sliding portion slidably and rotatably connected to the intermediate connector.

In one embodiment, the intermediate connector may include an insert extending substantially along the second axis, the insert is inserted into the rear vane connector and rotatably connected therewith, and the insert may be substantially perpendicular with the first axis.

In one embodiment, the intermediate connector may include an insert extending substantially along the second axis. The insert may be inserted into the rear vane connector and rotatably connected therewith. The insert may further intersect with the first axis.

In one embodiment, the sliding portion of the front vane connector may be formed as a rod. The intermediate connector may include a sleeve at least partially receiving the sliding portion, and an insert extending along the second axis. The insert may be inserted into the rear vane connector and rotatably connected therewith. The sleeve may be of a first angle with the insert.

In one embodiment, the front vane connector may include a shaft portion connected with the sliding portion, and may be of a second angle therewith. The shaft portion may be configured to rotatably connect to an adjustment portion of the front vane.

In one embodiment, the rear vane connector may include a first side wall and a second side wall opposing with each other. The first side wall and the second side wall may include a first aperture and a second aperture, respectively to rotatably connect the rear vane with the rear vane connector.

In one embodiment, the rear vane connector may further include a third side wall and a fourth side wall positioned between the first side wall and the second side wall and opposing each other. The third side wall and the fourth side wall may include a third aperture and a fourth aperture, respectively to receive the insert to support the rotation of the intermediate connector.

According to another aspect of the present disclosure, a vehicle air register assembly is disclosed. The vehicle air register assembly comprises a first front vane, a first rear vane, and an adjustment device. The adjustment device includes a rear vane connector rotatably connected to the rear vane about a first axis substantially parallel to the lengthwise direction of the first rear vane, an intermediate connector rotatably connected to the rear vane connector, and a front vane connector rotatably connected to the front vane and including a sliding portion slidably and rotatably connected to the intermediate connector. The intermediate connector includes an insert substantially perpendicular and intersecting with the first axis. The front vane connector rotatably connected to the front vane and including a sliding portion slidably and rotatably connected to the intermediate connector.

In one embodiment, the sliding portion of the front vane connector may be a rod. The intermediate connector may include a sleeve configured to at least partially receive the sliding portion. The sleeve may be formed integrally with the insert and is angled with the insert.

In one embodiment, the first rear vane may include an opening, and a first base and a second base extending from a surface of the first rear vane adjacent to the edge of the opening, such that the rear vane connector may be rotatably connected to the first base and the second base.

In one embodiment, the rear vane connector may be of a frame structure. The intermediate connector may be rotatably connected to the frame structure through the insert.

In one embodiment, the first front vane may include a body portion extending along the lengthwise direction of the first front vane, and an adjustment portion slidably enclosing a portion of the body portion along the lengthwise direction of the first front vane. The front vane connector may further include a shaft portion connected to the sliding portion with an angle therebetween. The shaft portion may be rotatably connected to the adjustment portion.

In one embodiment, the shaft portion may extend along the lengthwise direction of the first front vane.

In one embodiment, the adjustment portion may have a channel extending in the lengthwise direction of the first front vane and receiving a portion of the body portion.

In one embodiment, opposing side walls of the rear vane may have a first aperture and a second aperture. The first aperture and the second aperture may receive two corresponding projections on the first base and the second base, respectively. The straight line between the centers of the first aperture and the second aperture substantially may coincide with the first axis.

In one embodiment, the lengthwise direction of the first front vane and the lengthwise direction of the first rear vane may be non-perpendicular with each other.

According to another aspect of the present disclosure, a vehicle air register assembly is disclosed. The vehicle air register assembly comprises a housing, a first front vane rotatably connected to the housing and including a body portion and an adjustment portion, the adjustment portion having a channel extending along the lengthwise direction of the body portion and receiving part of the body portion in order to slide relative to the body portion, a plurality of front vanes drivably linked with the first front vane, a first rear vane rotatably connected to the housing and extending along a direction different from the lengthwise direction of the first front vane, the first rear vane including an opening area and a base extending from a surface of the first rear vane adjacent to the edge of the opening area, a plurality of rear vanes drivably linked with the first rear vane, and an adjustment device. The adjustment device includes a rear vane connector, an intermediate vane connected and a front vane connector. The rear vane connector is positioned in the opening area of the first rear vane and rotatably connected to the first rear vane, and the rear vane connector may rotate about a first axis in parallel with the lengthwise direction of the first rear vane. The intermediate connector rotatably is connected to the rear vane connector and includes an insert and a sleeve which may be is formed integrally with the insert and is angled with the insert. The insert is positioned within the rear vane connector, substantially perpendicularly intersecting with the first axis, and the insert may rotate about an axis in parallel with the lengthwise direction of the insert. The front vane connector includes a sliding rod and a shaft portion of a second angle with the sliding rod. The sliding rod may slide within the sleeve of the intermediate connector and rotate relative to the sleeve about an axis substantially parallel with the length direction of the sleeve. The shaft portion is rotatably connected with the adjustment portion at the bottom of the adjustment portion.

In one embodiment, the base of the first rear van may include a first base having a first projection and a second base having a second projection. The rear vane connector includes a first side wall having a first aperture and a second side wall having a second aperture. The first aperture and the second aperture are adjacent with the first base and the second base respectively to receive the first projection and the second projection such that the rear vane connector may rotate about the first axis. The rear vane connector may include a third side wall and a fourth side wall positioned between the first side wall and the second side wall and opposing with each other. The third side wall and the fourth side wall have a third aperture and a fourth aperture to receive a first protrusion and a second protrusion positioned on the insert of the intermediate connector respectively so that the intermediate connector is capable of rotating about an axis substantially parallel to its lengthwise direction.

In one embodiment, the first rear vane and the plurality of rear vanes may be substantially parallel to the long edge of the housing. The rotation axis of the first front vane may be angled with the rotation axis of the first rear vane.

In one embodiment, the second angle between the sliding rod and the shaft portion may be about 90 degrees.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

One or more advantageous features as described herein will be readily apparent from the following detailed description of one or more embodiments when taken in connection with the accompanying drawings.

BRIEF DESCRIPTION OF THE DRAWINGS

For more complete understanding of one or more embodiments of the present invention, reference is now made to the one or more embodiments illustrated in greater detail in the accompanying drawings and described below.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to variously employ the present invention.

In the specification, it should be understood that, the terms such as "central", "lengthwise", "widthwise", "thickness", "above", "below", "front", "rear", "right", "left", "vertical", "horizontal", "top", "bottom", "inner", "outer" should be construed to refer to the orientation as described or as shown in the drawings. These terms are merely for convenience and concision of description and do not alone indicate or imply that the device or element referred to must have a particular orientation. Thus, it cannot be understood to limit the present disclosure.

Figure 1:
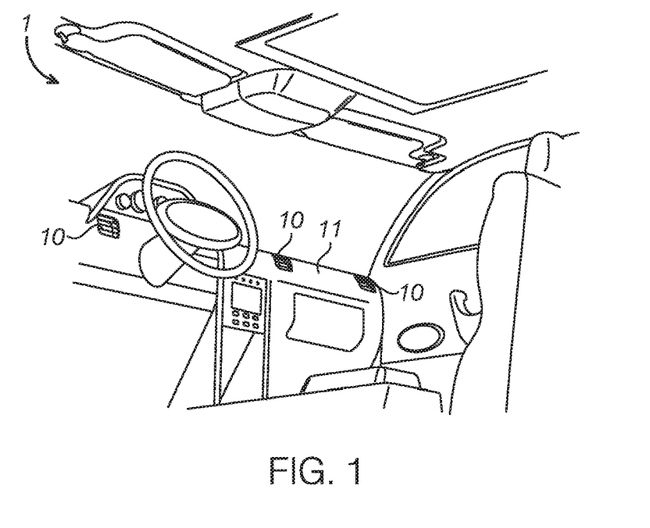
FIG. 1 schematically depicts a portion of a vehicle interior in which the embodiments of the present disclosure may be implemented.

FIG. 1 schematically depicts a portion of the interior of a vehicle 1 in one or more embodiments. As depicted in FIG. 1, the vehicle 1 includes an instrument panel 11 and one or more air register assemblies 10 positioned on the instrument panel 11. The air register assembly 10 may be positioned as required. Although the air register assembly 10 is shown to be located on the instrument panel 11 in front of the front row seats in FIG. 1, other locations are possible. For instance, air registers may be located in other places to provide comfort for the second row passengers. For example, it may be provided on the central console facing the second row such that the passengers in the back seat may adjust the air register as necessary. Moreover, although the air register is discussed under the context of the vehicles, it should be appreciated that the present design may be applied in similar situations where air flow and direction need to be adjusted. In addition, vehicles should be interpreted to include cars, ships, airplanes and other means of transportation.

Figure 2:
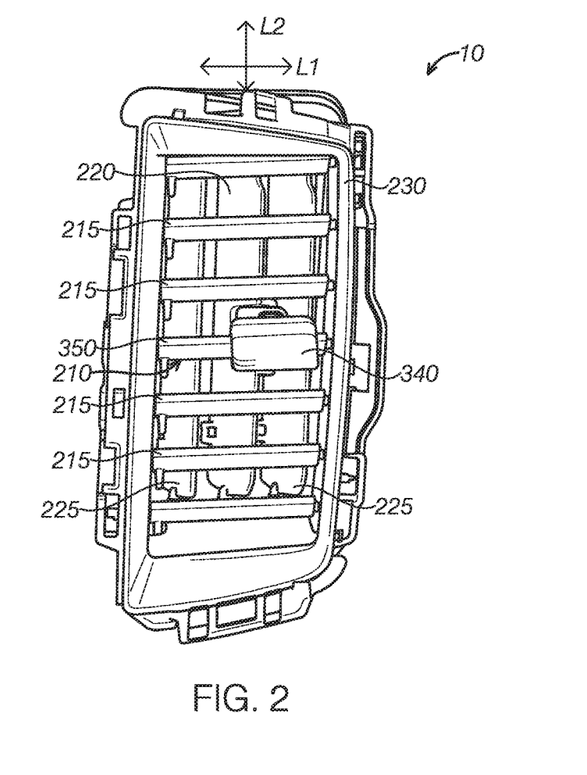
FIG. 2 schematically depicts an enlarged view of a vehicle air register according to one or more embodiments of the present disclosure.

FIG. 2 schematically depicts a perspective view of the vehicle air register assembly 10 according to one or more embodiments of the present disclosure. As shown in FIG. 2, in one or more non-limiting examples, the vehicle register assembly 10 may include a housing 230 located on the instrument panel or elsewhere, a first front vane 210, and a first rear vane 220. The first front vane 210 extends along a first direction L1, and the first rear vane 220 extends along a second direction L2. In one embodiment, the first direction L1 may be not perpendicular with the second direction L2, such as having an angle of 45 degrees, 60 degrees, or 75 degrees between them. In other embodiment, as required, the first direction L1 and the second direction L2 may be perpendicular with each other. Further, in certain instances, the upper and lower edges of the housing 230 may be parallel to the first direction L1, and the left and right edges may be parallel to the second direction L2.

In one or more embodiments of the present disclosure, the first front vane 210 may include a body portion 350 extending along its lengthwise direction L1, and an adjustment portion 340 slidably receiving the body portion 350 along the direction L1.

The air register assembly 10 may further include a plurality of second front vanes 215 drivably linked to the first front vane 210, and a plurality of second rear vanes 225 drivably linked to the first rear vane 220. Various linkage mechanisms used for vanes have been used in the air register, and thus are not detailed herein for brevity. Any suitable linkage mechanism may be utilized for the vehicle air register assembly 10 in one or more embodiments of the present disclosure.

As described herein elsewhere, the vehicle air register assembly 10 further includes a vane adjustment device connected with both the adjustment portion 340 of the first front vane 210 and the first rear vane 220. The adjustment device may be utilized to adjust the first front vane 210 and corresponding second front vane 215, as well as the first rear vane 220 and corresponding second rear vane 225, so that the air flow direction and/or flow rate may be adjusted. It should be appreciated that "front" or "rear" as mentioned herein or elsewhere is for the ease of explanation of the relative positions of the vanes and is not intended to be limiting. For instance, a "front" vane may be a vane that is closer to a user at an assembled position, and a "rear" vane may be a vane that is further from the user relative to the "front" vane. Similarly, "first" is not intended to be limiting and is simply for ease of explanation.

Figure 3A:
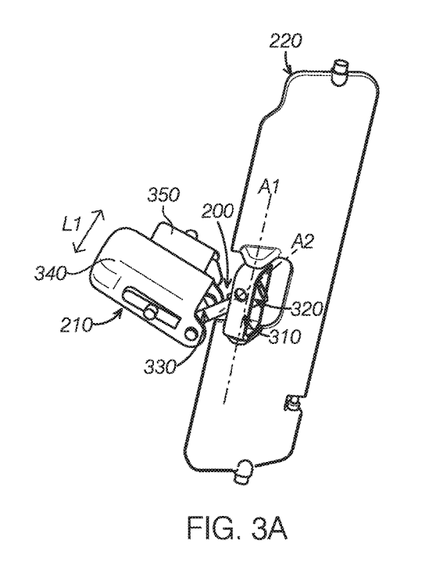
FIG. 3A schematically depicts a perspective view of an adjustment device of a vehicle air register assembly according to one embodiment of the present disclosure, illustrating the front vane positioned in a first position while the rear vane positioned in a third position.
Figure 3B:
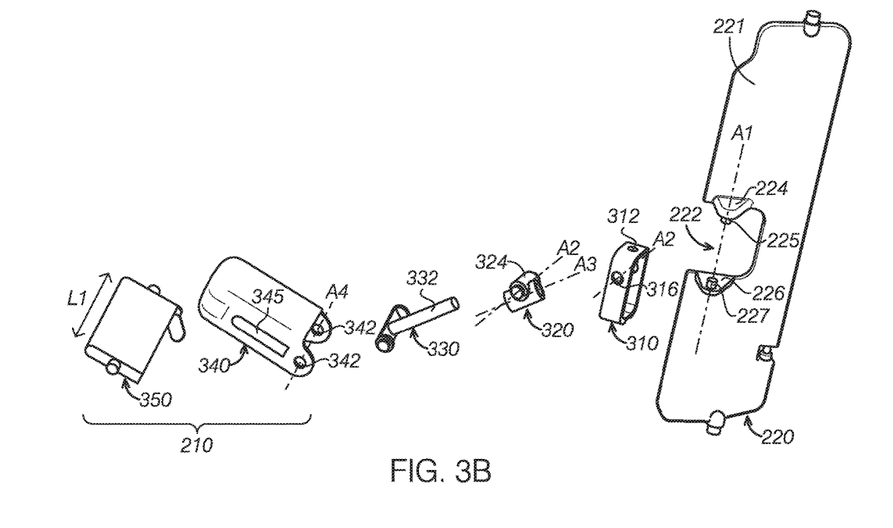
FIG. 3B schematically depicts an exploded view of the adjustment device as referenced in FIG. 3A.

Referring to FIGS. 3A and 3B, according to one or more embodiments of the present disclosure, the vane adjustment device 200 includes a rear vane connector 310 rotatably connected to the first rear vane 220 along a first axis A1, an intermediate connector 320 rotatably connected to the rear vane connector 310 along a second axis A2 different with the first axis A1, and a front vane connector 330 rotatably connected to the first front vane 210. The front vane connector 330 further includes a slide portion 332 slidably and rotatably connected to the intermediate connector 320.

In one or more embodiments, the first rear vane 220 may include a body 221 and an opening 222 formed on the body 221. The first rear vane 220 may further include a first base 224 and a second base 226 extending from the surface of the body 221 adjacent to the edge of the opening 222, such that the rear vane connector 310 may be rotatably connected.

Figure 6A:
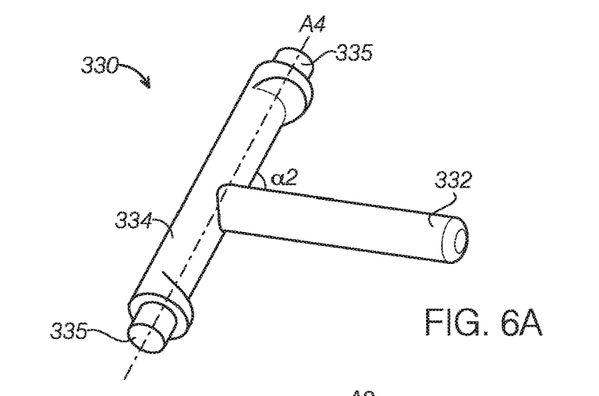
FIG. 6A schematically depicts a perspective view of a front vane connector as referenced in FIG. 3B.
Figure 6B:
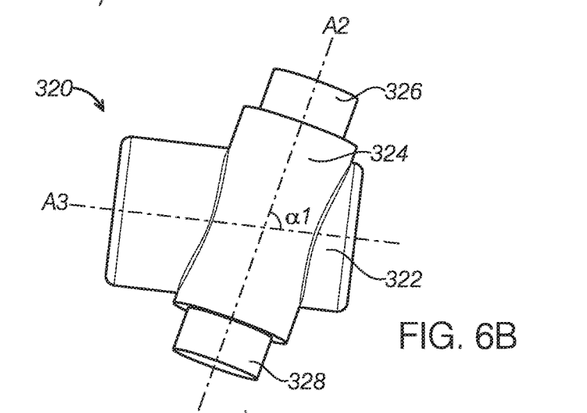
FIG. 6B schematically depicts a perspective view of an intermediate connector as referenced in FIG. 3B.
Figure 6C:
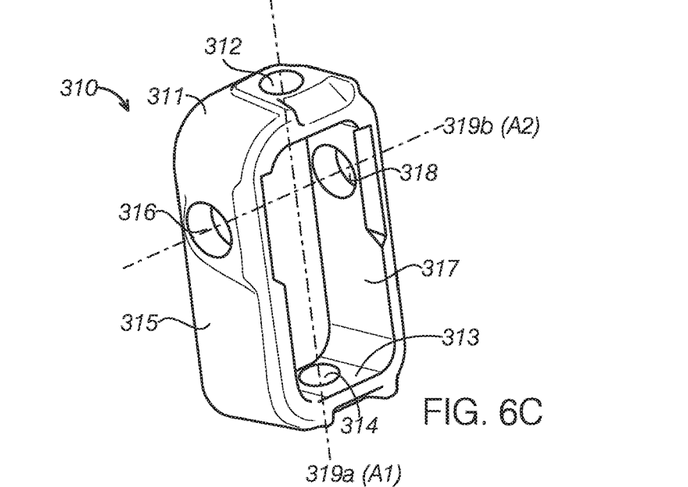
FIG. 6C schematically depicts a perspective view of a rear vane connector as referenced in FIG. 3B.

Referring to FIG. 3B and FIG. 6C, in one embodiment, the rear vane connector 310 may include a first side wall 311 and a second side wall 313 opposing each other. The first side wall 311 may include a first aperture 312, and the second side wall 313 may include a second aperture 314. Correspondingly, the first base 224 of the first rear vane 220 may include a first projection 225, and the second base 226 may include a second projection 227. The first aperture 312 and the second aperture 314 may receive the first and second projections 225, 227 respectively, such that the rear vane connector 310 may rotate relative to the first rear vane 220. Further, when the rear vane connector 310 is connected to the first rear vane 220, a straight line 319a between centers of the first and second apertures 312, 314 or a line between centers of the first and second projections 225, 227 may substantially coincide with the first axis A1. This structure is advantageous in that the rear vane connector 310 may rotate about the first axis A1 relative to the first rear vane 220.

Further, the rear vane connector 310 may include a third side wall 315 and a fourth side wall 317 positioned between the first side wall 311 and the second side wall 313 and opposing each other. The third side wall may include a third aperture 316, and the fourth side wall 317 may include a fourth aperture 318. As described herein elsewhere, the third aperture 316 and the fourth aperture 318 may receive at least a portion of the insert 324 of the intermediate connector 320, thus supporting the rotation of the intermediate connector 320.

Referring to FIGS. 3B and 6B, the intermediate connector 320 may include an insert 324 extending substantially along a second axis A2, and the insert 324 may be inserted into the rear vane connector 310 tightly and rotatably connected with the rear vane connector 310. In other words, the lengthwise direction of the insert 324 may be substantially in parallel with the second axis A2. For illustration purposes, the insert 324 is shown as a rod extending along the second axis A2. In other implementations, the insert may be formed as other shapes substantially extending along the second axis A2, such as curved, dogleg shape, etc. The insert 324 may include rotation points positioned along the second axis A2 and spaced apart with each other, and a body portion with various shapes. In one example, the two ends 326, 328 may be received within the third aperture 316 and the fourth aperture 318 separately to support the rotation. When the intermediate connector 320 is connected with the rear vane connector 310, the straight line 319b between the centers of the third and fourth aperture 316, 318 or the straight line between the centers of the two ends 326, 328 of the insert 324 may substantially coincide with the second axis A2. Such structure is especially advantageous in that the intermediate connector 320 is enabled to rotate about the second axis A2 relative to the rear vane connector 310.

In certain instances, the first axis A1 may be substantially perpendicular with the insert 324. The first axis A1 may also intersect with the insert 324. In this way, the first axis A1 may be substantially perpendicular with and intersect with the second axis A2, thus the operation of the adjustment device is more easy to use.

In one embodiment, the rear vane connector 310 may be formed as a frame structure, and the intermediate connector 320 may rotatably connected within the frame structure via the insert 324. In this way, the straight line 319a between the centers of the first aperture 312 and the second aperture 314 may be perpendicular with and intersect with the line 319b. Such structure is especially advantageous in that the relationship between the first axis A1 and the second axis A2 is easy to control, thus is easy for users to adjust the vanes.

It should be appreciated that the first, second, third, and fourth apertures 312, 314, 316, and 318 are illustratively shown as through holes in figures. As needed, they could be formed as other shapes separately, such as blind holes. In another embodiment, the first side wall 311 and the second side wall 313 of the rear vane connector 310 may be formed with projections on their outside surfaces, and the first base 224 and the second base 226 of the rear vane 220 may be formed with corresponding holes. The rear vane connector 310 and the rear vane 220 may be rotatably connected with each other via the projections and holes.

In some embodiments, the intermediate connector 320 may include a sleeve 322 to be connected to the front vane connector 330. The sleeve 322 may be of an angle α1 relative to the insert 324. As needed, α1 may be of a non-zero value, such as 45 degrees, 60 degrees, 75 degrees, or 90 degrees. In one embodiment, the sleeve may be formed integrally with the insert 324. In other embodiments, the sleeve 322 and the insert 324 may be formed separately and attached together.

Referring to FIG. 3B and FIG. 6A, in some embodiments, the front vane connector 330 may include a sliding portion 332. The sliding portion 332 is slidably connected with the sleeve 322 of the intermediate connector 320, and may rotate about a third axis A3 relative to the intermediate connector 320. In one embodiment as shown in FIGS. 6A and 6B, the sliding portion 332 is formed as a rod. In this way, the sliding portion 332 may be received within the sleeve 322 of the intermediate connector 320 for rotating and sliding movements. The outer diameter of the sliding portion 332 and the inner diameter of the sleeve 322 may be of similar size, such as of clearance fit. In this way, the sliding portion 332 may slide within the sleeve 322 along the third axis A3 and rotate relative to the sleeve 322 about the third axis A3 substantially parallel to the lengthwise direction of the sleeve 322. Such structure is especially advantageous in that there is less friction force and thus the adjustment device is relatively easy to operate. In other embodiments, the sliding portion may take various forms to slidably and rotatably connect with the intermediate connector. For example, the sliding portion may be formed as a sleeve, and the intermediate connector may be formed with a sliding rod.

Referring back to FIG. 6A, in one embodiment, the front vane connector 330 may include a shaft portion 334 connected with the sliding portion 332. The shaft portion 334 may be of a second angle α2 relative to the sliding portion 332. In one instance, α2 may be 90 degrees. As required, α2 may be of other values, such as 45 degrees, 60 degrees, 75 degrees, etc. Further, the shaft portion 334 may extend along the length direction L1 of the first front vane 210. As detailed herein elsewhere, the shaft portion 334 may be configured to rotatably connect to the adjustment portion 340 of the first front vane 210. In other words, the shaft portion 332 may rotate about the fourth axis A4.

Referring to FIG. 3B, the first front vane 210 may include a body portion 350 extending along its lengthwise direction L1, and an adjustment portion 340 slidably fitting over the body portion 350 along direction L1. In one embodiment, the adjustment portion 340 may have a channel 345 extending along direction L1 to receive part of the body portion 350. In this way, the adjustment portion 340 may slide relative to the body portion 350. The bottom of the adjustment portion 340 may be formed with holes 342 to connect with the ends 335 of the shaft portion 334 of the front vane connector 330. In this way, the shaft portion 334 may be rotatably connected to the adjustment portion 340.

Figure 4:
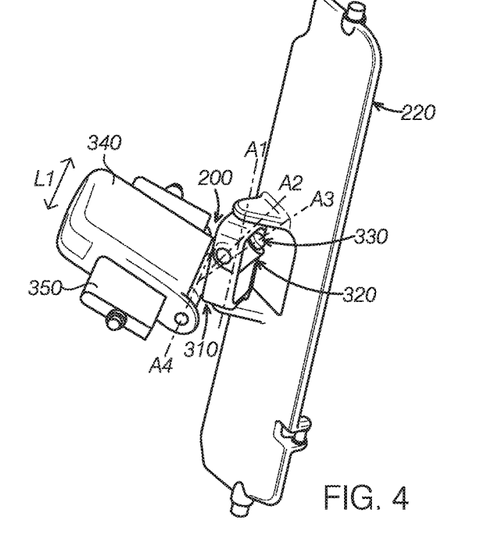
FIG. 4 schematically depicts another perspective view of the adjustment device as referenced in FIG. 3A, illustrating the front vane positioned in the first position while the rear vane positioned in a fourth position.
Figure 5:
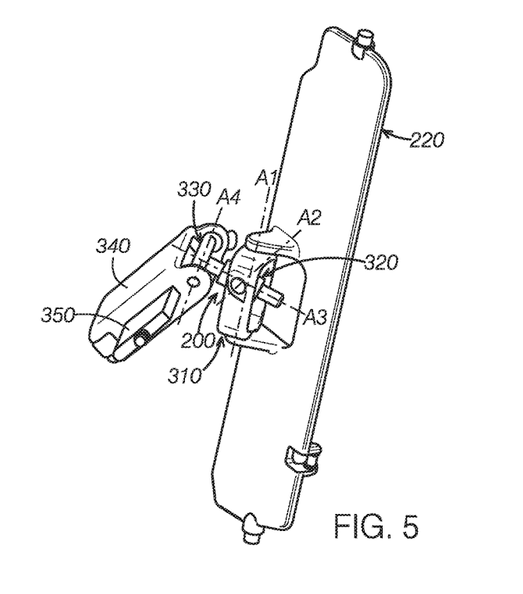
FIG. 5 schematically depicts yet another perspective view of the adjustment device as referenced in FIG. 3A, illustrating the front vane positioned in a second position while the rear vane positioned in the fourth position.

Referring to FIGS. 3A, 4, and 5, the adjustment device 200 is illustratively depicted in various states. FIG. 3A illustratively shows the adjustment device 200 in its first state. The first front vane 210 is shown in its first position to guide the air flow from the air register assembly 10 substantially upwardly, and the first rear vane 220 is shown in its third position to guide the air flow from the air register assembly 10 substantially toward the first side (such as right hand side) of the passenger.

Then, if the passenger wants the first front vane 210 to remain in its first position to guide air flow toward the head area of the passenger, and to change the position of the first rear vane 220 to guide air flow toward the second side (such as left hand side) opposing to the first side of the passenger, he or she may move the adjustment portion 340 along direction L1 relative to the body portion 350. In this way, the front vane connector 330 may rotate about the fourth axis A4 relative to the adjustment portion 340. The front vane connector 330 may further slide and rotate about the third axis A3 relative to the intermediate connector 320. The intermediate connector 320 may rotate relative to the rear vane connector 310 about the second axis A2. The rear vane connector 310 may rotate relative to the first rear vane 220 about the first axis A1. The first rear vane 220 may rotate relative to the housing 230 to the fourth position as illustratively shown in FIG. 4. In FIG. 4, the adjustment device 200 is shown in its second state. During the transition from the first state to the second state, connectors of the adjustment device rotate about four axes separately, functioning similarly to a universal joint. In this way, even when front and rear vanes are not parallel to the edges of the air register outlet, the adjustment device may control the orientation and position of vanes to achieve expected air flow direction and flow rate.

Also, if the passenger wants the first rear vane 220 to remain in its fourth position to guide air flow toward the second side of the passenger, and to change the position of the first front vane 210 to guide air flow toward the foot area of the passenger or downward, he or she may keep the adjustment portion 340 unmoved relative to the body portion 350 along direction L1, and rotate the first front vane 210 (including both body portion 350 and the adjustment portion 340) downwards relative to the housing 230 to a second position. In this way, the adjustment portion 340 may rotate relative to the front vane connector 330 (e.g., about the fourth axis A4). The front vane connector 330 may slide and rotate about the third axis A3 relative to the intermediate connector 320. The intermediate connector 320 may rotate relative to the rear vane connector 310 about the second axis A2. The rear vane connector 310 may rotate relative to the first rear vane 220 about the first axis A1. The first rear vane 220 may remain in its fourth position without any position change. In FIG. 5, the adjustment device 200 is shown in its third state. During the transition from the second state to the third state, connectors of the adjustment device rotate about four axes separately, functioning similarly to a universal joint.

Similarly, passengers may retain the first front vane 210 in its second position to guide air flow towards the foot area of the passenger, and change the position of the first rear vane 220 to guide air flow toward the first side of the passenger.

Figure 7:
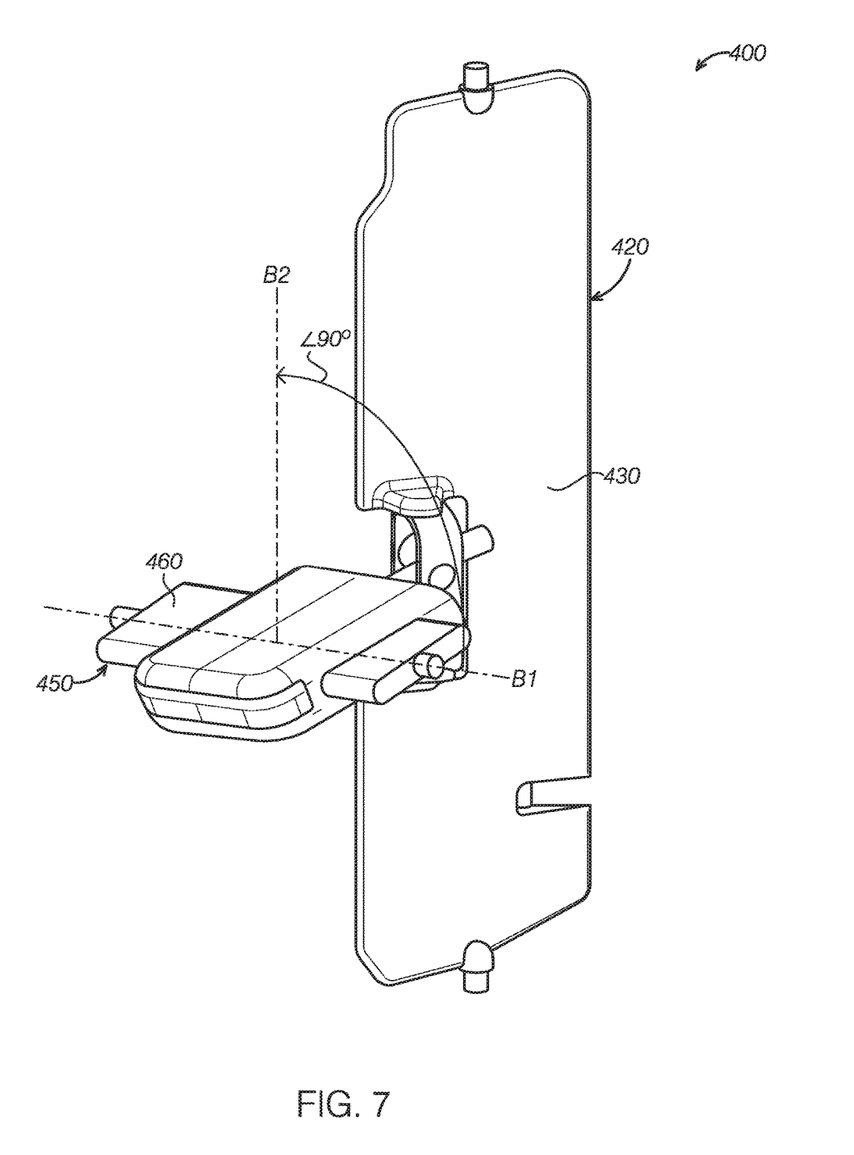
FIG. 7 schematically depicts another perspective view of the adjustment device.

FIG. 7 illustratively depicts an embodiment of the adjustment device 400. In the embodiment, the rear vane may be in parallel with the long edge of the air register housing and be angled with the front vane, such that the rotation axis B1 of the front vane be angled with the rotation axis B2 of the rear vane, e.g., the rotation axis B1 may not be perpendicular with the rotation axis B2, wherein the rotation axis B1 may be parallel with the surface 460 of the body portion 450 of the first front vane, and the rotation axis B2 may be parallel with the surface 430 of the first rear vane. In the depicted example, the angle between the rotation axis B1 and the rotation axis B2 is slightly less than 90 degrees, such as about 85 degrees. In a traditional air register structure, the rotation axis B1 needs to be perpendicular with the rotation axis B2 so that the rear vane may be driven effectively. However, the vanes of the air register disclosed herein may rotate and slide along several directions, and thus could adjust the orientation of the rear vanes. As shown in FIG. 7, in a structure where the front and rear vanes are not perpendicular with each other, the rotation axis B1 of the first front vane and the rotation axis B2 of the first rear vane may be configured as non-perpendicular, and the adjustment device 400 may still adjust the rear vane to achieve expected air flow direction, flow rate, and/or close the rear vane.

In one or more embodiments, the present disclosure provides a vane adjustment device, and a vehicle air register assembly, such that the front and rear vanes of the air register could be adjusted separately without being configured as perpendicular with each other. In this way, the vanes may be configured as parallel with each other in order to improve the air flow efficiency. One skilled in the art will readily recognize from such discussion, and from the accompanying drawings and claims that various changes, modifications and variations can be made therein without departing from the true spirit and fair scope of the invention as defined by the following claims.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A vane adjustment device for an air register having a front vane and a rear vane, comprising:
    a rear vane connector connected to the rear vane rotatably about a first axis,
    an intermediate connector connected to the rear vane connector rotatably about a second axis different from the first axis, and
    a front vane connector rotatably connected to the front vane, the front vane connector including a sliding portion slidably connected to the intermediate connector;
    wherein the intermediate connector includes an insert extending substantially along the second axis, the insert is inserted into the rear vane connector and rotatably connected therewith, and the insert intersects with the first axis.

2. The vane adjustment device of claim 1, wherein the insert is perpendicular with the first axis.

3. The vane adjustment device of claim 1, wherein the sliding portion of the front vane connector is formed as a rod, and the intermediate connector includes a sleeve at least partially receiving the sliding portion, and the insert extending along the second axis, the insert is inserted into the rear vane connector and rotatably connected therewith, and the sleeve is of a first angle with the insert.

4. The vane adjustment device of claim 1, wherein the front vane connector includes a shaft portion connected with the sliding portion and of a second angle therewith, the shaft portion is configured to rotatably connect to an adjustment portion of the front vane, wherein the adjustment portion extends along a lengthwise direction of the front vane and is configured to slidably receive a portion of the front vane.

5. The vane adjustment device of claim 2, wherein the rear vane connector includes a first side wall and a second side wall opposing each other, the first side wall and the second side wall include a first aperture and a second aperture, respectively to rotatably connect the rear vane with the rear vane connector.

6. The vane adjustment device of claim 5, wherein the rear vane connector further includes a third side wall and a fourth side wall positioned between the first side wall and the second side wall and opposing each other, the third side wall and the fourth side wall include a third aperture and a fourth aperture, respectively to receive the insert to support rotation of the intermediate connector.

7. A vehicle air register assembly, comprising:
    a first front vane,
    a first rear vane, and
    an adjustment device, including
        a rear vane connector connected to the first rear vane rotatably about a first axis substantially parallel to a lengthwise direction of the first rear vane,
        an intermediate connector rotatably connected to the rear vane connector and including an insert perpendicular and intersect with the first axis, and
        a front vane connector rotatably connected to the first front vane and including a sliding portion slidably connected to the intermediate connector and a shaft portion connected to the sliding portion with an angle therebetween.

8. The vehicle air register assembly of claim 7, wherein the sliding portion of the front vane connector is a rod, and the intermediate connector includes a sleeve configured to at least partially receive the sliding portion, and wherein the sleeve is formed integrally with the insert and is angled with the insert.

9. The vehicle air register assembly of claim 8, wherein the first rear vane includes an opening, and a first base and a second base extending from a surface of the first rear vane adjacent to an edge of the opening, such that the rear vane connector may be rotatably connected to the first base and the second base.

10. The vehicle air register assembly of claim 9, wherein the rear vane connector is a frame structure, and the intermediate connector is rotatably connected to the frame structure through the insert.

11. The vehicle air register assembly of claim 10, wherein the first front vane includes a body portion extending along a lengthwise direction of the first front vane, and an adjustment portion configured to receive a portion of the body portion along the lengthwise direction of the first front vane and connected with the shaft portion of the front vane connector, wherein the shaft portion is rotatably connected to the adjustment portion.

12. The vehicle air register assembly of claim 11, wherein the shaft portion extends along the lengthwise direction of the first front vane.

13. The vehicle air register assembly of claim 11, wherein the adjustment portion has a channel extending in the lengthwise direction of the first front vane and receiving a portion of the body portion of the first front vane.

14. The vehicle air register assembly of claim 11, wherein opposing side walls of the rear vane connector have a first aperture and a second aperture, the first aperture and the second aperture receive two corresponding projections on the first base and the second base, respectively, wherein a straight line between centers of the first aperture and the second aperture substantially coincides with the first axis.

15. The vehicle air register assembly of claim 14, wherein the lengthwise direction of the first front vane and the lengthwise direction of the first rear vane are non-perpendicular with each other.

16. A vehicle air register assembly, comprising:
 a housing,
 a first front vane rotatably connected to the housing and including a body portion and an adjustment portion, the adjustment portion having a channel extending along a lengthwise direction of the body portion and receiving a part of the body portion to slide relative to the body portion,
 a plurality front vanes drivably linked with the first front vane,
 a first rear vane rotatably connected to the housing and extending along a direction different with the lengthwise direction of the first front vane, where the first rear vane includes an opening area and a base extending from a surface of the first rear vane adjacent to an edge of the opening area,
 a plurality of rear vanes drivably linked with the first rear vane, and
 an adjustment device, including
  a rear vane connector, wherein the rear vane connector is positioned in the opening area of the first rear vane and rotatably connected to the first rear vane, and the rear vane connector may rotate about a first axis in parallel with a length direction of the first rear vane,
  an intermediate connector rotatably connected to the rear vane connector, wherein the intermediate connector includes an insert and a sleeve, the sleeve is formed integrally with the insert and is angled with the insert, the insert is positioned within the rear vane connector and is perpendicular and intersecting with the first axis, and the insert may rotate about an axis in parallel with a lengthwise direction of the insert, and
  a front vane connector, wherein the front vane connector includes a sliding rod and a shaft portion, wherein a lengthwise direction of the sliding rod and a lengthwise direction of the shaft portion forms an angle, the sliding rod is slidable within the sleeve of the intermediate connector, and the shaft portion is rotatably connected with the adjustment portion at a bottom of the adjustment portion.

17. The vehicle air register assembly of claim 16, wherein the base includes a first base having a first projection and a second base having a second projection, the rear vane connector includes a first side wall and a second side wall, the first side wall and the second side wall include a first aperture and a second aperture adjacent with the first base and the second base respectively to receive the first projection and the second projection such that the rear vane connector is capable of rotating about the first axis, and
 wherein the rear vane connector further includes a third side wall and a fourth side wall positioned between the first side wall and the second side wall and opposing each other, the third side wall and the fourth side wall include a third aperture and a fourth aperture to receive a first protrusion and a second protrusion positioned on the insert of the intermediate connector, respectively so that the intermediate connector may rotate about an axis substantially parallel to its lengthwise direction.

18. The vehicle air register assembly of claim 16, wherein the first rear vane and the plurality of rear vanes are substantially parallel to a long edge of the housing, and a rotation axis of the first front vane is angled with a rotation axis of the first rear vane.

19. The vehicle air register assembly of claim 16, wherein the angle between the sliding rod and the shaft portion is about 90 degrees.

* * * * *